No. 865,713. PATENTED SEPT. 10, 1907.
P. LAMOUROUX.
APPARATUS FOR STERILIZING AND FILLING VESSELS.
APPLICATION FILED NOV. 17, 1905.
3 SHEETS—SHEET 1.
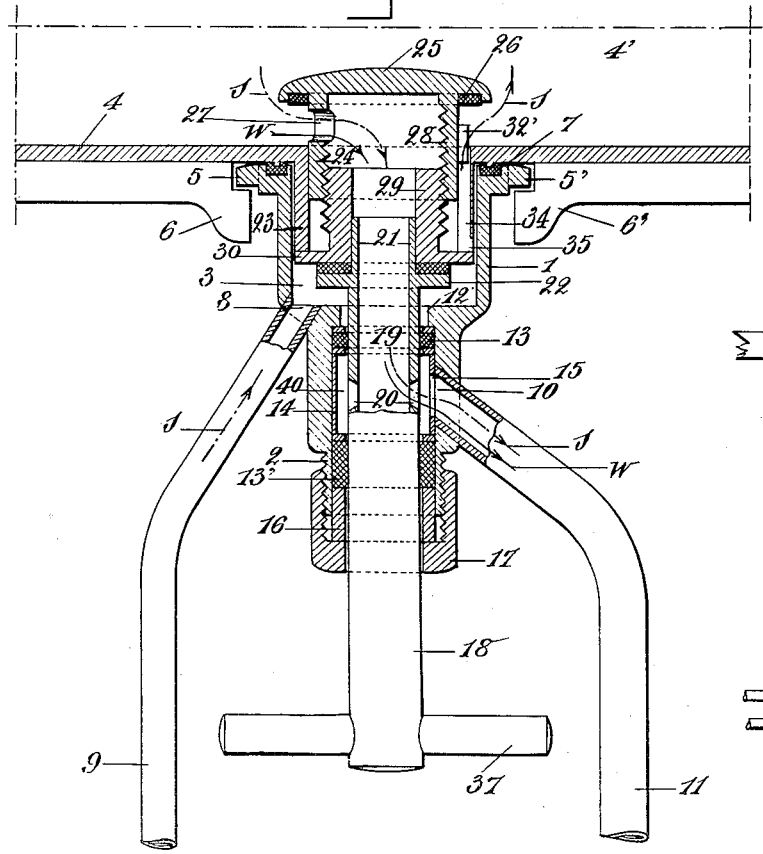
Fig. 1
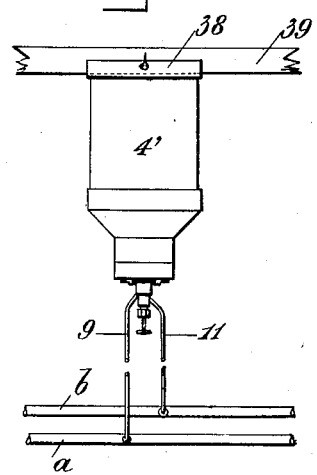
Fig. 2
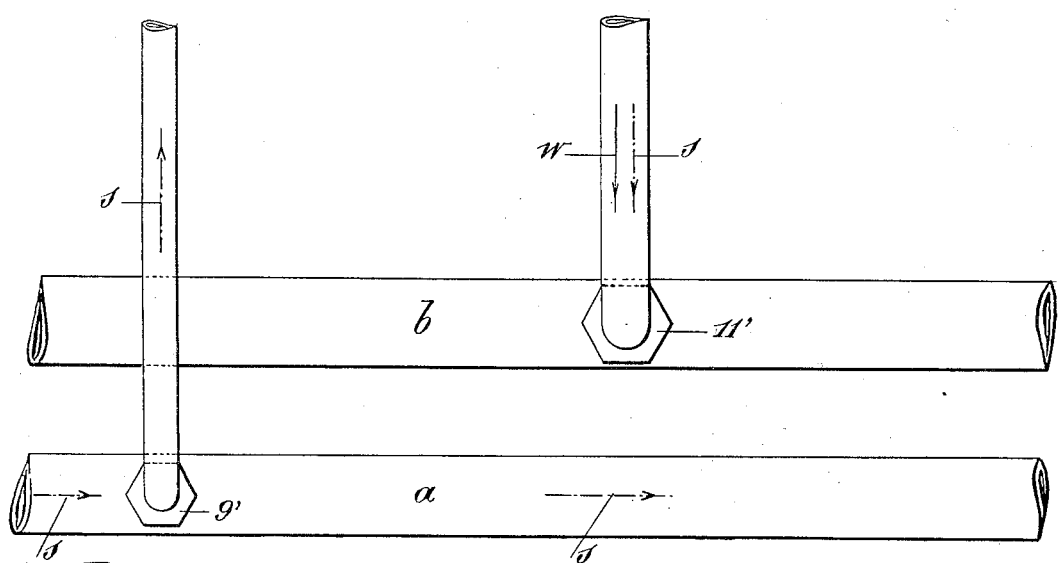
WITNESSES
Alvin T. White
W. P. Burke
INVENTOR.
Pierre Lamouroux
BY
Richard
ATTYS

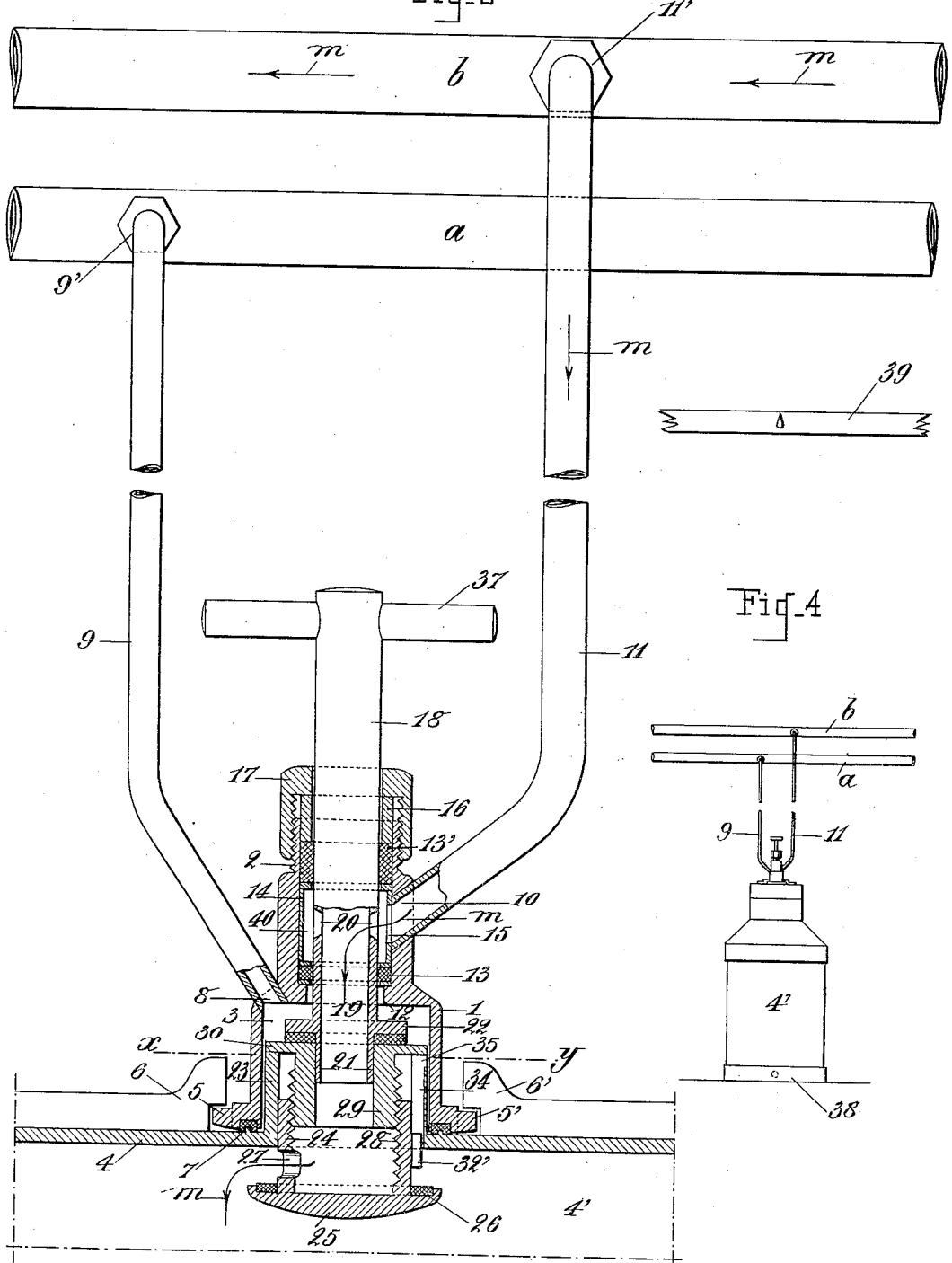

No. 865,713. PATENTED SEPT. 10, 1907.
P. LAMOUROUX.
APPARATUS FOR STERILIZING AND FILLING VESSELS.
APPLICATION FILED NOV. 17, 1905.

3 SHEETS—SHEET 3.

WITNESSES
Alvin G. White
W. P. Burk

INVENTOR
Pierre Lamouroux
BY
Richards
ATTYS

UNITED STATES PATENT OFFICE.

PIERRE LAMOUROUX, OF PARIS, FRANCE, ASSIGNOR TO T. W. STEMMLER, OF NEW YORK, N. Y.

APPARATUS FOR STERILIZING AND FILLING VESSELS.

No. 865,713.　　　　Specification of Letters Patent.　　　　Patented Sept. 10, 1907.

Application filed November 17, 1905. Serial No. 287,821.

*To all whom it may concern:*

Be it known that I, PIERRE LAMOUROUX, a citizen of France, residing at Paris, France, have invented new and useful Improvements in Apparatus for Sterilizing and Filling Vessels, of which the following is a specification.

The present invention has for its object an apparatus devised for effecting with exclusion of air the pasteurization, sterilization, and filling of the vessels intended for carrying pasteurized or sterilized liquids and especially for carrying milk. This apparatus enables the receptacles in question to be immediately connected upon the tubes destined for pasteurizing or sterilizing them, and for filling them, operations which are effected successively and require nothing more than simply reversing the receptacles and the operation of the requisite cocks placed upon the aforesaid tubes. These tubes are arranged in such a manner that the one of them can connect the apparatus forming the object of the present invention either with a source of steam or with the upper part of the sterilizing autoclave, and the other of the said tubes can connect the aforesaid apparatus either with the outer air or with the lower part of the sterilizing autoclave, according to the position given to the cocks above specified.

Figure 5:
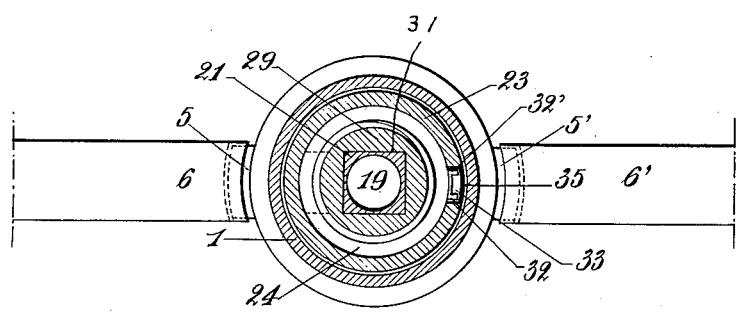
Figure 6:
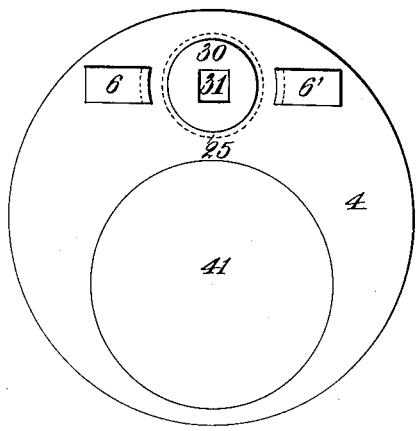

In order to make the description of the apparatus more clear reference is made to the accompanying drawing, in which is illustrated by way of example: Figure 1, a sectional elevation of the apparatus in question, in position for sterilizing. Fig. 2, a diagrammatical view, showing a recipient provided with aforesaid apparatus, and in position for sterilizing. Figs. 3 and 4, views corresponding respectively to Figs. 1, 2, but the apparatus being in position for filling. Fig. 5, a plan section on the line $(x)$—$(y)$ of Fig. 3. Fig. 6, a plan view of the upper part of a receptacle upon which is fitted the apparatus in question.

This apparatus which forms the object of the present invention comprises the following constituent elements. The cover 1 adapted to be fitted air-tight upon the top 4 of the receptacle 4' to sterilize and to fill, and coöperating with a special stopper permanently fixed upon the said receptacle. The cover in question is connected by the flexible tubes 9, 11 to the two principal pipes $(a)$, $(b)$, of which the first $(a)$ may communicate with a source of steam or with the upper part of the sterilizing autoclave, while the second tube $(b)$ may communicate with the outer air or with the lower part of any sterilizing autoclave (a well known apparatus which may be of any used construction and constitutes no part of my present invention); controlling three way cocks are suitably arranged for this purpose upon the said pipes, in order to insure, according to the position into which they are turned, the aforesaid communications.

The special stopper above mentioned is described in my copendent application, Serial Number 336,891 filed October 1, 1906, & constituting a subdivision of my present application. The said stopper is permanently fixed upon the upper part of each receptacle, and is susceptible of being operated from the outside when the cover corresponding to the said receptacle has been fixed upon this latter.

The cover above-mentioned comprises a metal piece 1, the upper part whereof forms a cylinder threaded externally at its end 2 and its lower part forms a chamber 3, capable of being fixed upon the top 4 of the receptacle 4' in any convenient manner, for example by means of lugs 5, 5' and projecting ledges 6, 6' and so as to secure a joint which is absolutely tight, by means of a suitable washer 7. The outer wall of the chamber 3 is traversed by an opening 8 to which opening there is permanently attached one of the ends of the flexible pipe 9. The other end of this pipe can be secured by means of a junction 9', or in any other convenient way, to the pipe $(a)$ above-mentioned. The wall of the cylindrical part of the cover 1 is also traversed by an opening 10 upon which is permanently fixed one of the ends of the flexible pipe 11, the other end whereof can be secured by means of a junction 11', or any other suitable means, upon the pipe $(b)$, above-mentioned.

At the base of the cylindrical part in question, there is a slight circular ridge 12 upon which rests a compression ring 13 which may be held between two metallic washers, one of which, namely the upper washer is itself surmounted by a metal ring 14 pierced with a hole 15 at the level of the opening 10. This ring 14 supports, by means of another metal ring, a second compressible ring 13' upon which is again placed another washer 16. The screw 17 pressing upon the washer 16 produces, with the above described rings and washers, a practical stuffing box, in the interior whereof a cylindrical rod 18 can move and forming around the said rod and between the compressible rings 13 and 13' a tight annular chamber 40 communicating directly with the tube 11 through the orifice 15 and the opening 10. The rod 18, closed at its upper end, has throughout almost its entire length a central channel 19 which may communicate with the above-mentioned annular chamber 40; and consequently with the pipe 11, when the rod 18 is in such a position that the lateral apertures 20, pierced in it, may be between the two compressible rings 13 and 13'. The length of the channel 19 is so calculated that, in this position of the rod 18, its lower part terminates in a square part 21 and the projection 22 which limits the descent of the said rod so that it comes in contact with the special stopper or plug, itself mentioned at the commencement of this specification and permanently fixed upon the top 4 of the receptacle. In order to make more clear the present specification, it will be remembered here that this plug is established in the following manner. The top 4 of the receptacle has a cylindrical neck 23, in the interior of which a cylindrical sleeve 24 can move. The bottom of this cylinder is formed by a plate 25 provided with an external and compressible ring 26 so as to form a tight joint, when this ring is pressed upon the internal face of the top 4 of the receptacle. At its lower part the sleeve 24 is moreover pierced by a hole 27 while its upper part has an internal threading 28, corresponding to that of a threaded sleeve 29 which has a plate 30 engaging with the neck 23 and having, at its center, a square 31 into which enters the end 21 of the bar 18. Moreover, the sleeve 24 has, on the line of two similar generatrices, two longitudinal projections 32, 32′. These form an open channel 33 and engage in a corresponding rib 34 formed in the interior of the neck 23. This rib communicates, at its upper part, with the chamber 3 of the head by means of a hole 35 formed in the wall of the neck 23.

The apparatus being thus constructed the operations for the sterilizing and the filling can be effected very easily as follows.

1.—*Sterilizing*, (Figs. 1, 2).—After having connected the flexible tubes 9 and 11 respectively to the corresponding general pipes (a), (b), the head is secured upon the receptacle and the bar is caused to descend so as to engage the square 21 and the corresponding hole 31 of the disk 30 and the bar 18 is then turned by means of a handle 37 in the direction suitable for releasing the sleeve 24, which is then moved longitudinally from the top 4 of the receptacle because the projections 32 and 33 prevent it from turning with the sleeve 29. The different parts of the system then occupy relative positions represented in Fig. 3 of the drawing. The receptacle is then turned up side down and hooked by its bottom 38 upon a suitable support 39 (Fig. 2), which may receive in the same manner, any number of the receptacles to be sterilized, which are each provided with the above described arrangement of parts. The receptacles and their attached parts must be placed above the level of the point at which the general tube (b), from which the tubes 11 branch off, communicates with the outer air. If the cocks arranged for the purpose be then drawn in proper position to put in communication with the source of steam the general conduit (a), from which are branched the tubes 9, and the general conduit b from which are branched the tubes 11 in communication with the outer atmosphere, then each of the receptacles 4′ will be traversed by a current of steam, following the way indicated by the arrows (s), while the water produced by the condensation will escape to the outside with the steam, following the way indicated by the arrows (w).

2.—*Filling*, (Figs. 3, 4).—When the sterilizing is completed, the three-way cocks controlling the communication of the general conduit (a), (b), are closed, the receptacles 4′ are detached from the support 39 and are placed in their normal position, without touching either the rod 18 or the flexible tubes 9 and 11 and so that the covers are below the level of the point where the general conduit (b) to which the tubes 11 are connected, communicates with the sterilizing autoclave. The tubes 9 and 11 are then placed respectively in communication with the upper and lower part of the autoclave, by turning to the suitable position the three-way cocks above-mentioned, and the receptacles fill themselves on the principle of communicating vessels, the sterilized liquid reaching them in the direction indicated by the arrows (m). After the filling is finished, which may be ascertained in any convenient manner, the plug 25 is closed by suitably moving the rod 18 and the receptacle is ready for delivery.

It should be remarked that by turning suitably the three-way cocks upon the conduit (a), in order to place the latter in communication with the source of steam, after filling and before closing the receptacles, the liquids remaining in the apparatus will be forced back into the sterilizing autoclave.

In order to remove the sterilized liquid from the receptacle, the top 4 of the receptacle may be provided with a circular opening, which can be closed before each sterilization and filling by means of a metallic plate 41 soldered to the plate, the opening of which can be effected when required in the manner for instance of that usual with preserved foods.

What I claim as my invention is:—

An apparatus for sterilizing and filling receptacles provided with adjustable stoppers and intended for the transport of sterilized liquids, the said apparatus comprising a cover capable of being fitted air-tight upon the top of the receptacle, two principal conduits communicating respectively with a source of steam or with the upper part of the sterilizing autoclave, and with the outer air or with the lower part of the said autoclave respectively; two flexible tubes connecting the cover with the conduits, the said cover having a lower chamber into which discharges directly the tube connected with the first of the aforesaid conduits and having also an upper cylindrical chamber, a rod having openings therein and having a portion passing through the upper chamber and into the lower chamber, said rod having in its lower part a central conduit which can be set in communication with the tube connected with the second of the two conduits above mentioned, when the openings in the said rod are brought by the lowering of the rod into the upper chamber into which the last mentioned tube terminates; the lower end of the said rod having a square portion coöperating when the said rod is depressed, with the adjustable stopper upon the top of the receptacle.

In testimony whereof I have signed my name to this specification in the presence of two subscribing witnesses.

PIERRE LAMOUROUX.

Witnesses:
JULES FAYOLLET,
EUGÈNE GICHON.